US009229241B2

(12) United States Patent
Woo et al.

(10) Patent No.: US 9,229,241 B2
(45) Date of Patent: Jan. 5, 2016

(54) STEREOSCOPIC IMAGE DISPLAY DEVICE AND DRIVING METHOD THEREOF (75) Inventors: HeeSung Woo, Daegu (KR); YoungSik Kim, Gumi-si (KR); SangHun Park, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 172 days.

(21) Appl. No.: 13/296,984

(22) Filed: Nov. 15, 2011

(65) Prior Publication Data

US 2013/0009859 A1    Jan. 10, 2013

(30) Foreign Application Priority Data

Jul. 7, 2011    (KR) ........................ 10-2011-0067439

(51) Int. Cl.
*G02B 27/22* (2006.01)
*H04N 13/04* (2006.01)
*G09G 3/00* (2006.01)

(52) U.S. Cl.
CPC .......... *G02B 27/225* (2013.01); *G02B 27/2214* (2013.01); *G09G 3/003* (2013.01); *H04N 13/0413* (2013.01); *H04N 13/0468* (2013.01); *G09G 2320/0209* (2013.01); *G09G 2354/00* (2013.01)

(58) Field of Classification Search
CPC ........... G02B 27/2214; G02B 27/2228; G02B 27/225; H04N 13/0413; H04N 13/0468; G09G 3/003; G09G 2354/00; G09G 2320/0209
USPC ................ 345/419; 348/42–60; 359/462–477
See application file for complete search history.

(56) References Cited

U.S. PATENT DOCUMENTS

| 6,049,424 A * | 4/2000 | Hamagishi ............... 359/464 |
| 7,612,833 B2 * | 11/2009 | Kim ............................. 349/15 |
| 2006/0139447 A1 * | 6/2006 | Unkrich .......................... 348/51 |
| 2007/0176914 A1 | 8/2007 | Bae et al. |
| 2007/0183015 A1 * | 8/2007 | Jacobs et al. ................ 359/245 |
| 2011/0084963 A1 | 4/2011 | Im |
| 2012/0200680 A1 * | 8/2012 | So et al. ......................... 348/54 |

FOREIGN PATENT DOCUMENTS

| CN | 101419352 A | 4/2009 |
| JP | 2002-300611 A | 10/2002 |
| KR | 10-2006-0096844 A | 9/2006 |
| TW | 200935138 A | 8/2009 |

* cited by examiner

*Primary Examiner* — Kathy Wang-Hurst
*Assistant Examiner* — David Tung
(74) *Attorney, Agent, or Firm* — Birch, Stewart, Kolasch & Birch, LLP (57) ABSTRACT

A stereoscopic image display device and a driving method thereof, which correct the viewing position of a viewer in initial driving of a 3D display mode, are discussed. The stereoscopic image display device includes a display module, a barrier module, a position detector, and a position detector. The display module separates a left-eye image and a right-eye image to display a stereoscopic image. The barrier module is disposed in correspondence with the display module, and forms a light transmitting area for transmitting the left-eye image and right-eye image and a light blocking area for blocking the left-eye image and right-eye image. The position detector detects position information on a viewer which views the stereoscopic image displayed on the display module. The position detector corrects positions of the light transmitting area and light blocking area on the basis of viewing position information on the viewer.

10 Claims, 9 Drawing Sheets

STEREOSCOPIC IMAGE DISPLAY DEVICE AND DRIVING METHOD THEREOF

CROSS REFERENCE TO RELATED APPLICATIONS

This application claims the benefit of the Korean Patent Application No. 10-2011-0067439 filed on Jul. 7, 2011, which is hereby incorporated by reference as if fully set forth herein.

BACKGROUND

1. Field of the Invention

The present invention relates to a stereoscopic image display device, and more particularly, to a stereoscopic image display device and a driving method thereof, which correct the viewing position of a viewer in initial driving of a Three-Dimensional (3D) display mode.

2. Discussion of the Related Art

Generally, stereoscopic (or 3D) image display devices are devices that respectively provide different images to the left eye and right eye of a viewer, and thus enable the viewer to view the stereoscopic image with a binocular parallax between the left eye and right eye thereof.

Recently, research is being actively conducted on a non-glasses type where a viewer does not wear 3D glasses. As the non-glasses type, there are a lenticular type where a left-eye image and a right-eye image are separated from each other by a cylindrical lens array, and a barrier type where a left-eye image and a right-eye image are separated from each other by a barrier.

Figure 1:
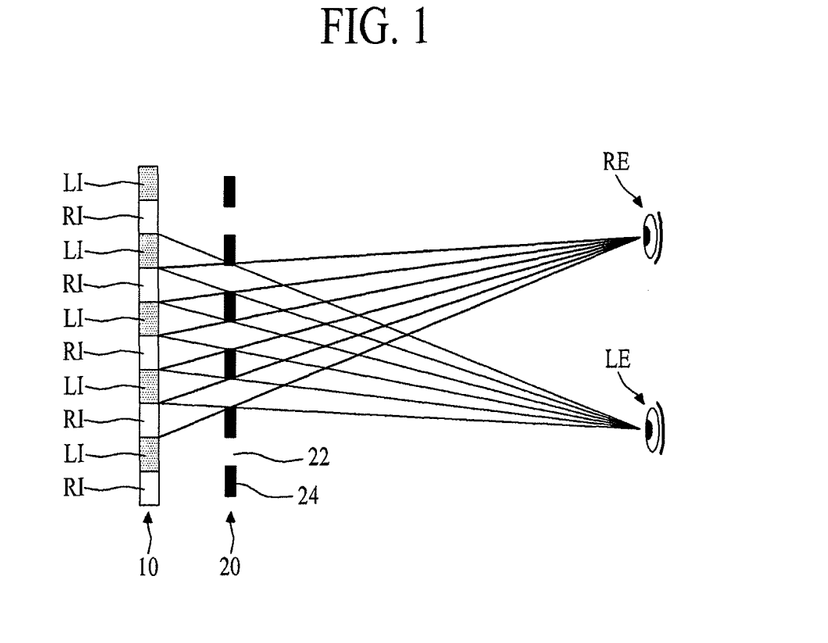
FIG. 1 is a view for schematically describing a typical barrier type stereoscopic image display device.

FIG. 1 is a view for schematically describing a typical barrier type stereoscopic image display device.

Referring to FIG. 1, the typical barrier type stereoscopic image display device includes a display panel 10 that separates and displays a left-eye image LI and a right-eye image RI, and a barrier panel 20 that is formed to have a light transmitting area 22 and a light blocking area 24 which are arranged alternately and disposed at the front of the display panel 10.

A viewer views an image displayed on the display panel 10 through the light transmitting area 22 of the barrier panel 20, in which case a left-eye LE and right-eye RE of the viewer look at different areas of the display panel 10 through the same light transmitting area 22. Therefore, a viewer views the left-eye image LI and right-eye image RI, which are displayed adjacently to each other, through the light transmitting area 22 and thus feels three-dimensional.

The typical barrier type stereoscopic image display devices are capable of changing a display mode to a Two-Dimensional (2D) display mode or a 3D display mode according to states of the light transmitting area 22 and light blocking area 24 that are formed in the barrier panel 20. Accordingly, the typical barrier type stereoscopic image display device is being recently applied to televisions (TVs), monitors, notebook computers, net book computers, tablet computers, mobile devices, etc.

However, in the typical barrier type stereoscopic image display devices, since the light transmitting area 22 and light blocking area 24 formed in the barrier panel 20 are fixed in position, when the viewing position of a viewer is changed, the viewer cannot view a stereoscopic image or feels dizzy.

SUMMARY

Accordingly, the present invention is directed to a stereoscopic image display device and a driving method thereof that substantially obviate one or more problems due to limitations and disadvantages of the related art.

The present invention is directed to provide a stereoscopic image display device and a driving method thereof, which correct the viewing position of a viewer in initial driving of a 3D display mode.

The present invention is directed to provide a stereoscopic image display device and a driving method thereof, which correct the viewing position of a viewer according to the movement of the stereoscopic image display device, in initial driving of a 3D display mode.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a stereoscopic image display device including: a display module separating a left-eye image and a right-eye image to display a stereoscopic image; a barrier module disposed in correspondence with the display module, and forming a light transmitting area for transmitting the left-eye image and right-eye image and a light blocking area for blocking the left-eye image and right-eye image; a position detector detecting position information on a viewer which views the stereoscopic image displayed on the display module; and a controller correcting positions of the light transmitting area and light blocking area on the basis of viewing position information on the viewer.

The position detector may detect one of eyes, eyeball, and eyebrows of the viewer to detect the viewing position information.

The barrier module may include: a barrier panel including a liquid crystal layer, and a liquid crystal driving electrode part which changes an aligned state of liquid crystal molecules in the liquid crystal layer; and a barrier driver generating a barrier voltage for forming the light transmitting area and light blocking area in the barrier panel according to control of the controller based on the viewing position information, and applying the barrier voltage to the liquid crystal driving electrode part.

The liquid crystal driving electrode part may include: a plurality of lower substrate electrodes formed on a first substrate disposed on the display module, wherein the barrier voltage from the barrier driver is addressed to the lower substrate electrodes; and an upper substrate electrode formed on a second substrate which is coupled to the first substrate with the liquid crystal layer therebetween, and receiving a common voltage from the barrier driver.

The controller may generate first voltage change information for changing a state of the barrier voltage applied to the lower substrate electrodes on the basis of the viewing position information such that the light transmitting area and light blocking area are accurately disposed at the viewing position of the viewer, and the barrier driver may change a state of the barrier voltage applied to the lower substrate electrodes, according to the first voltage change information.

The stereoscopic image display device may further include a movement detector detecting movement information on the stereoscopic image display device, wherein the controller may control the barrier driver for the positions of the light transmitting area and light blocking area to be corrected according to the movement information detected by the movement detector.

The controller may generate second voltage change information for changing a state of the barrier voltage applied to the lower substrate electrodes for the positions of the light transmitting area and light blocking area to be corrected according to the movement information, and the barrier driver may change the state of the barrier voltage applied to the lower substrate electrodes to correspond to the second voltage change information.

The controller may detect a rotated angle and a rotated direction on the basis of the movement information, and generate the second voltage change information for correcting the positions of the light transmitting area and light blocking area according to the rotated angle and rotated direction.

In another aspect of the present invention, there is provided a driving method of a stereoscopic image display device, which includes: a display module separating a left-eye image and a right-eye image to display a stereoscopic image; and a barrier module disposed in correspondence with the display module, and forming a light transmitting area for transmitting the left-eye image and right-eye image and a light blocking area for blocking the left-eye image and right-eye image, including: detecting position information on a viewer which views the stereoscopic image displayed on the display module; correcting positions of the light transmitting area and light blocking area which are formed in the barrier module, on the basis of viewing position information on the viewer; separating the left-eye image and right-eye image to display a stereoscopic image on the display module; and providing the stereoscopic image to the viewer through the corrected light transmitting area and light blocking area.

The position information on the viewer may include a position of one of eyes, eyeball, and eyebrows of the viewer.

The correcting of positions may include shifting the position of the light transmitting area or light blocking area to correspond to the viewing position information.

The driving method may further include: detecting movement information on the stereoscopic image display device; and correcting the positions of the light transmitting area and light blocking area according to the movement information.

The correcting of the positions may include: detecting a rotated angle and a rotated direction on the basis of the movement information; and shifting the position of the light transmitting area or light blocking area according to the rotated angle and rotated direction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, preferred embodiments of the present invention will be described with reference to the accompanying drawings.

Figure 2:
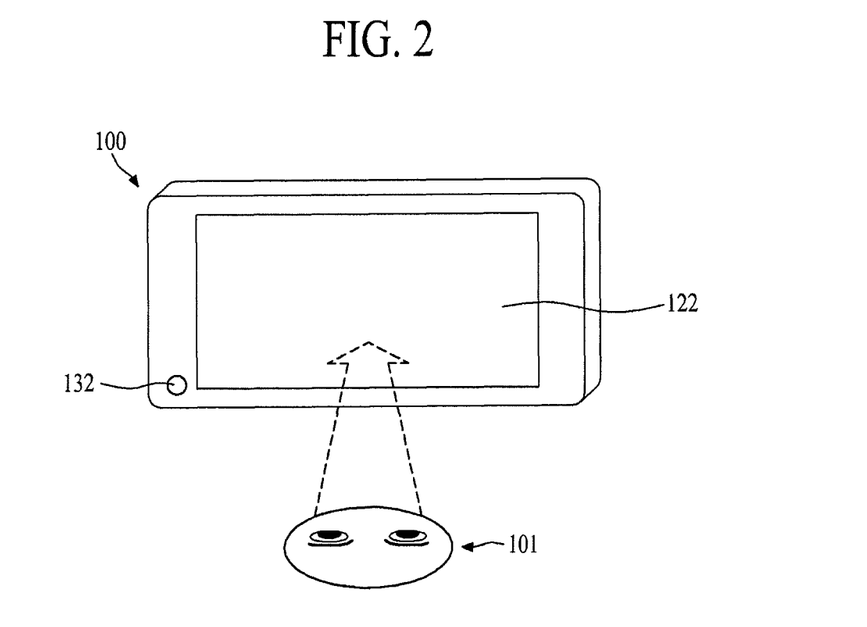
FIG. 2 is a view schematically illustrating a stereoscopic image display device according to a first embodiment of the present invention.
Figure 3:
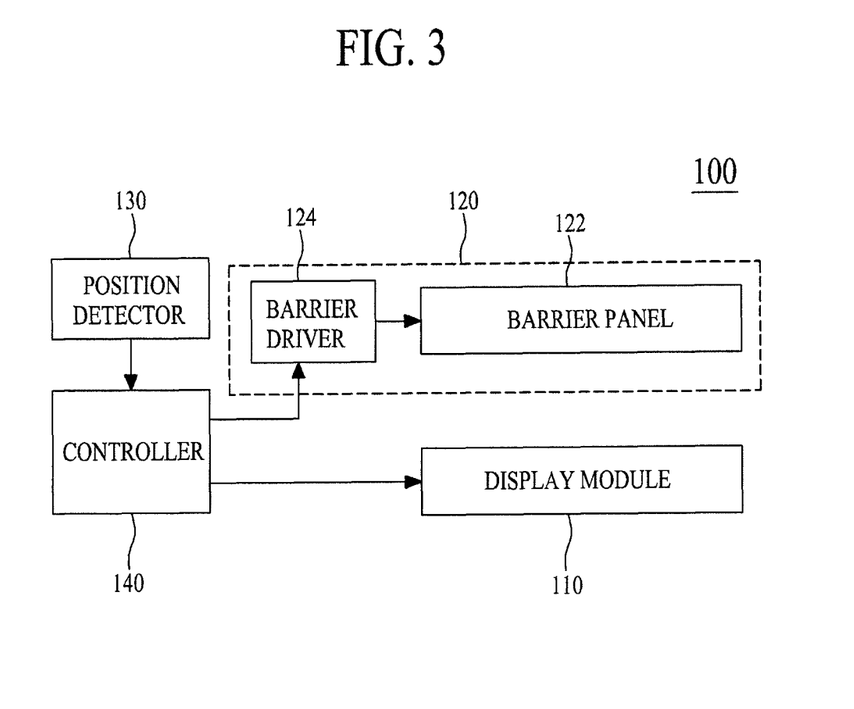
FIG. 3 is a block diagram schematically illustrating a stereoscopic image display device according to a first embodiment of the present invention.

FIG. 2 is a view schematically illustrating a stereoscopic image display device according to a first embodiment of the present invention. FIG. 3 is a block diagram schematically illustrating a stereoscopic image display device according to a first embodiment of the present invention.

Referring to FIGS. 2 and 3, a stereoscopic image display device 100 according to the first embodiment of the present invention includes: a display module 110 that separates and displays a left-eye image and a right-eye image; a barrier module 120 that is disposed in correspondence with the display module 110, and forms a light transmitting area for transmitting a left-eye image and right-eye image and a light blocking area for blocking the left-eye image and right-eye image; a position detector 130 that detects viewing position information on a viewer viewing the left-eye image and right-eye image; and a controller 140 that corrects a position of the light transmitting area and a position of the light blocking area on the basis of the viewing position information.

The display module 110 displays a planar image according to a 2D display mode, or separates and displays the left-eye image and right-eye image according to a 3D display mode. In this case, the left-eye image and right-eye image are alternately displayed in a certain direction. For this end, the display module 110 may include a flat display panel (not shown) and a panel driver (not shown).

The flat display panel may be a liquid crystal display panel, a plasma display panel, an organic light emitting display panel, or an electrophoretic display panel. For example, when the flat display panel is the liquid crystal display panel, a flat display module may further include a backlight unit that irradiates light on the liquid crystal display panel. Hereinafter, in the embodiment of the present invention, the flat display panel is assumed as being the liquid crystal display panel.

The panel driver may include a data driver that supplies an image signal to the flat display panel, a scan driver that supplies a scan signal to the flat display panel, and a timing controller that supplies planar image data or stereoscopic image data to the data driver according to a display mode and controls the driving timing of the data driver and the driving timing of the scan driver.

The barrier module 120 includes the light transmitting area and light blocking area that are formed at an upper portion thereof, and selectively transmits or blocks the left-eye image and right-eye image through the light transmitting area or light blocking area according to the control of the controller 140. For this end, the barrier module 120 includes a barrier panel 122 and a barrier driver 124.

Figure 4:
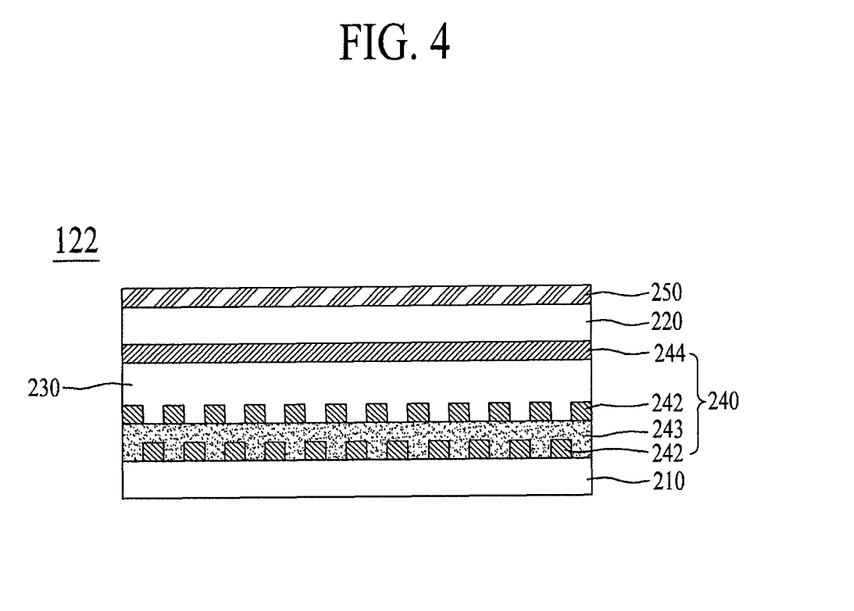
FIG. 4 is a sectional view schematically illustrating a barrier panel of FIG. 3.

The barrier panel 122, as illustrated in FIG. 4, includes a first substrate 210, a second substrate 220, a liquid crystal layer 230, and a liquid crystal driving electrode part 240.

The first substrate 210 is a glass substrate or plastic substrate that is formed of a transparent material, and is disposed on the display module 110. In this case, the first substrate 210 may be attached to or placed in the display panel of the display module 110.

The second substrate 210 is a glass substrate or plastic substrate that is formed of a transparent material, and is faced and coupled with the first substrate 210 with the liquid crystal layer 230 therebetween.

The liquid crystal layer 230 may be formed between the first and second substrates 210 and 230, and configured with Twisted Nematic (TN) liquid crystals or Super Twisted Nematic (STN) liquid crystals. In the liquid crystal layer 230, the alignment of liquid crystal molecules is changed according to a barrier voltage applied to the liquid crystal driving electrode part 240, and thus, the light transmitting area and light blocking area are selectively formed in the barrier panel 122. Therefore, the light transmitting area transmits an image, or the light blocking area blocks an image. For this end, the barrier panel 122 may be driven in a normally white mode. Herein, the barrier panel 122 driven in the normally white mode forms the light blocking area only when the barrier voltage is applied to the liquid crystal driving electrode part 240.

The liquid crystal driving electrode part 240 includes a plurality of lower substrate electrodes 242 and an upper substrate electrode 244.

The lower substrate electrodes 242 are formed on the first substrate 210, and the barrier voltage from the barrier driver 124 is individually addressed to the lower substrate electrodes 242.

The lower substrate electrodes 242 according to an embodiment of the present invention are parallelly formed to be spaced apart at certain intervals, on the first substrate 210.

A plurality of lower substrate electrodes 242 according to another embodiment of the present invention are parallelly formed to be spaced apart at certain intervals, on the first substrate 210, and formed in a multi-layer structure where the lower substrate electrodes 242 are crossed in a zigzag shape. For example, the lower substrate electrodes 242 may be formed in a double-layer structure with an insulation layer 243 therebetween, in which case lower substrate electrodes 242 formed on the insulation layer 243 are respectively formed between lower substrate electrodes 242 formed on the first substrate 210. In this way, when the lower substrate electrodes 242 are formed in a multi-layer structure, the light transmitting area and light blocking area formed in the barrier panel 122 may be controlled finely, and each of the light transmitting area and light blocking area may be formed in a lens shape.

The upper substrate electrode 244 is formed on the second substrate 210 to face the first substrate 210, and receives a common voltage from the barrier driver 124. In this case, the upper substrate electrode 244 may be formed over the second substrate 220 to face the first substrate 210, and formed in plurality to be spaced apart at certain intervals on the second substrate facing the first substrate 210, thereby receiving the common voltage.

The lower substrate electrodes 242 and upper substrate electrodes 244 may be formed of a transparent conductive material, but when the lower substrate electrodes 242 and upper substrate electrodes 244 have a fine line width so as not to decrease the brightness of the stereoscopic image display device, the lower substrate electrodes 242 and upper substrate electrodes 244 may be formed of an opaque metal material.

The barrier panel 122 may further include a first alignment layer (not shown) that is formed on the first substrate 210 to cover the lower substrate electrodes 242, and a second alignment layer (not shown) that is formed on the second substrate 220 to cover the upper substrate electrode 244. In this case, the first and second alignment layers are formed with the liquid crystal layer 230 therebetween, and thus align the liquid crystal molecules of the liquid crystal layer 230 in order for the liquid crystal layer 230 to be driven in the normally white mode.

Also, the barrier panel 122 may further include a polarization film 250 that is attached to a top (which is a surface exposed to the outside) of the second substrate 220.

The polarization film 250 blocks light that is not completely blocked by the light blocking area formed in the barrier panel 122. That is, the polarization film 250 allows only light passing through the light transmitting area of the barrier panel 122 to be outputted to the outside.

Referring again to FIGS. 3 and 4, the barrier driver 124 does not apply a barrier voltage to the liquid crystal driving electrode part 240 of the barrier panel 122 according to the control of controller 140 based on the 2D display mode, thereby forming the light transmitting area in the entirety of the barrier panel 122. Therefore, a planar image displayed on the display module 110 passes through the barrier panel 122 that is in a normally white state.

Figure 5:
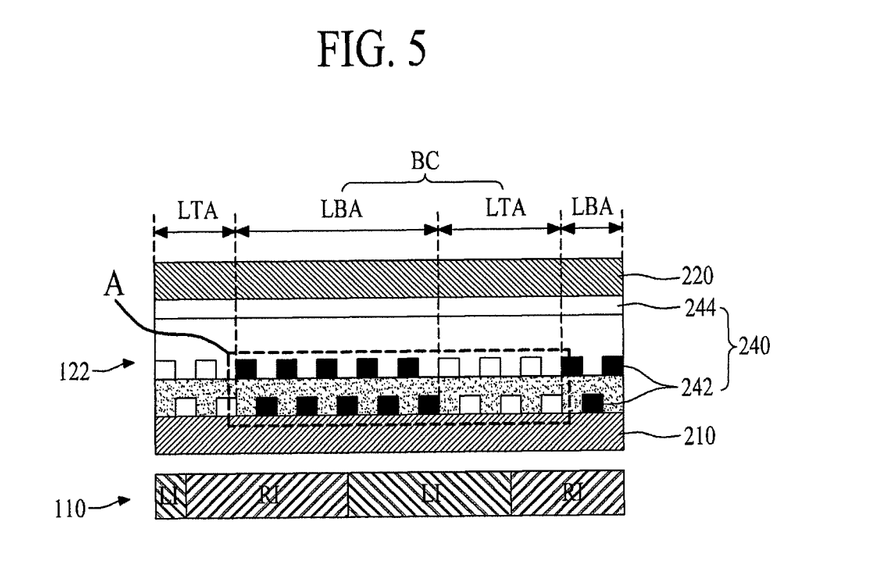
FIGS. 5 and 6 are views for describing a light transmitting area and a light blocking area which are formed in the barrier panel of FIG. 3.

On the other hand, the barrier driver 124 generates a barrier voltage and individually applies the barrier voltage to the lower substrate electrodes 242 formed in the barrier panel 122 according to the control of controller 140 based on the 3D display mode, and thus, as illustrated in FIG. 5, the barrier driver 124 alternately forms a light transmitting area LTA and a light blocking area LBA in the barrier module 122. For this end, the barrier driver 124 individually applies the barrier voltage to the respective lower substrate electrodes 242 of a plurality of barrier channels BC that are configured with a certain number of lower substrate electrodes 242 which are formed to be overlapped in a left-eye pixel and right-eye pixel of a display panel displaying the left-eye image LI and right-eye image RI, thereby forming the light transmitting area LTA and light blocking area LBA per barrier channel BC.

Figure 6:
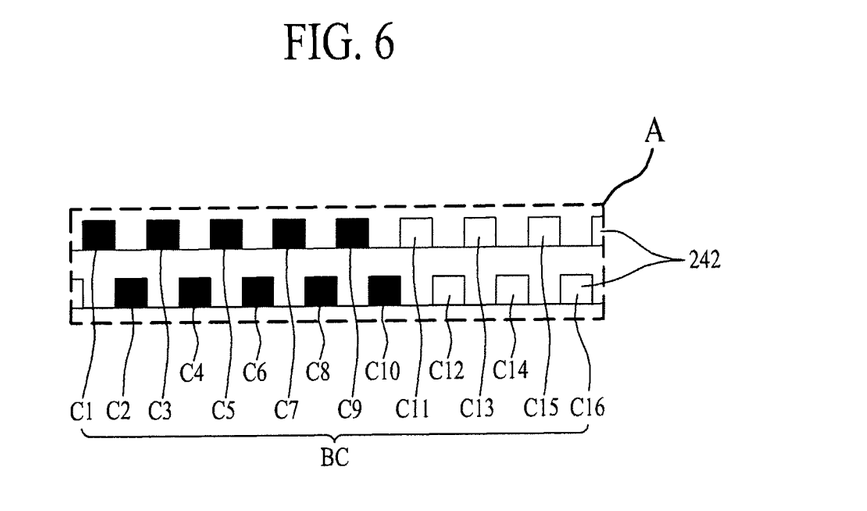

The number of lower substrate electrodes 242 for forming the light transmitting area LTA and light blocking area LBA of each barrier channel BC may be the same or not. Also, the number of lower substrate electrodes 242 configuring each barrier channel BC may vary according to the size and/or resolution of the display panel. For example, each barrier channel BC may be configured with sixteen lower substrate electrodes 242. Hereinafter, as illustrated in FIG. 6, each barrier channel BC is assumed as configured with sixteen lower substrate electrodes 242, and defined as first to sixteenth channels C1 to C16 for the sixteen lower substrate electrodes 242.

The barrier driver 124 individually applies the barrier voltage to the first to sixteenth channels C1 to C16 to perform addressing, and thus forms the light transmitting area LTA and light blocking area LBA per each barrier channel BC. In this case, the barrier driver 124 generates a first voltage for forming the light transmitting area LTA in the barrier channel BC and a second voltage for forming the light blocking area LBA in the barrier channel BC and individually applies the first and second voltages to the first to sixteenth channels C1 to C16, according to the control of the controller 140. Herein, the first voltage may be a ground voltage, and the second voltage may be a voltage having a certain level for changing the aligned state of liquid crystal molecules.

When the first voltage is applied to the first to sixteenth channels C1 to C16, the liquid crystal layer 230 of the barrier panel 122 forms the light transmitting area LTA in the barrier channel BC by maintaining the aligned state of the liquid crystal molecules in the normally white state. On the other hand, when the second voltage is applied to the first to sixteenth channels C1 to C16, the liquid crystal layer 230 of the barrier panel 122 forms the light blocking area LBA in the barrier channel BC by changing the aligned state of the liquid crystal molecules. For example, the light blocking area LBA may be formed according to the change of the aligned state of the liquid crystal molecules due to the second voltage that is applied to ten channels ("■" in FIG. 6). Furthermore, the light transmitting area LTA may be formed with the light blocking area LBA therebetween, and formed according to the alignment of the liquid crystal molecules, which are in the normally white state, due to the first voltage that is applied to six channels ("□" in FIG. 6).

Figure 7:
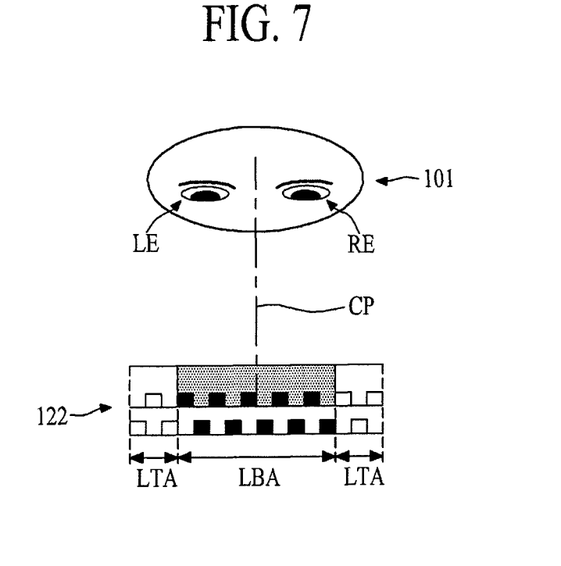
FIGS. 7, 8A and 8B are views for describing a method of correcting a viewer's viewing position and a position of a light blocking area.

Referring again to FIGS. 2 and 3, the position detector 130 detects viewing position information on a viewer 101 that views a stereoscopic image displayed on the display module 110, and supplies the viewing position information to the controller 140. That is, the position detector 130 detects one of the eyes, eyeball, and eyebrows of the viewer 101 to detect the viewing position information on the viewer 101 with the camera module 132. Herein, as illustrated in FIG. 7, the viewing position information on the viewer 101 may be information corresponding to a central portion CP (hereinafter referred to as a viewing position CP) between a left-eye LE and right-eye RE of the viewer 101. The position detector 130 may detect position information on the viewer 101 only when the stereoscopic image display device 100 is changed from the 2D display mode to the 3D display mode, but the present invention is not limited thereto. As another example, even when in the 3D display mode, the position detector 130 may detect the position information on the viewer 101 at certain intervals.

The controller 140 drives the display module 110 in order for a planar image or stereoscopic image to be displayed on the display panel, and controls the driving of the barrier module 120 according to an image displayed on the display panel. The controller 140 may be a Central Processing Unit (CPU), a Micro Control Unit (MCU), or a video processing module when the stereoscopic image display device 100 is a notebook computer, a net book computer, a tablet computer, or a mobile device. When the stereoscopic image display device 100 is a TV or a monitor, the controller 140 may be the timing controller for the display module 100.

The controller 140 corrects respective positions of the light transmitting area LTA and light blocking area LBA that are formed per each barrier channel BC, on the basis of the viewing position information supplied from the position detector 130.

Generally, when changing the 2D display mode to the 3D display mode, the stereoscopic image display device 100 forms the light transmitting area LTA and light blocking area LBA in a predetermined position per barrier channel BC of the barrier module 120 irrespective of whether the viewing position CP of the viewer 101 is a regular position. Therefore, when the viewing position CP of the viewer 101 is not matched with the central portion of the light blocking area LBA, the viewer 101 cannot view a stereoscopic image or feels dizzy. Accordingly, the controller 140 corrects respective positions of the light transmitting area LTA and light blocking area LBA, on the basis of the viewing position information on the viewer 101 supplied from the position detector 130.

Specifically, the controller 140 generates first voltage change information for changing the state of the barrier voltage applied to the channels C1 to C16 of each barrier channel BC such that the central portion of the light transmitting area LTA or light blocking area LBA is disposed at a regular position corresponding to the viewing position information on the viewer 101.

In an embodiment of the present invention, the first voltage change information may be information for individually applying the first voltage or second voltage to the channels C1 to C16 of each barrier channel BC.

In another embodiment of the present invention, the first voltage change information may be first shift information for shifting the second voltage, which is applied to ten channels ("■" in FIG. 6) forming the light blocking area LBA, per channel such that the central portion of the light transmitting area LTA or light blocking area LBA is disposed at the regular position corresponding to the viewing position of the viewer 101.

Figure 8A:
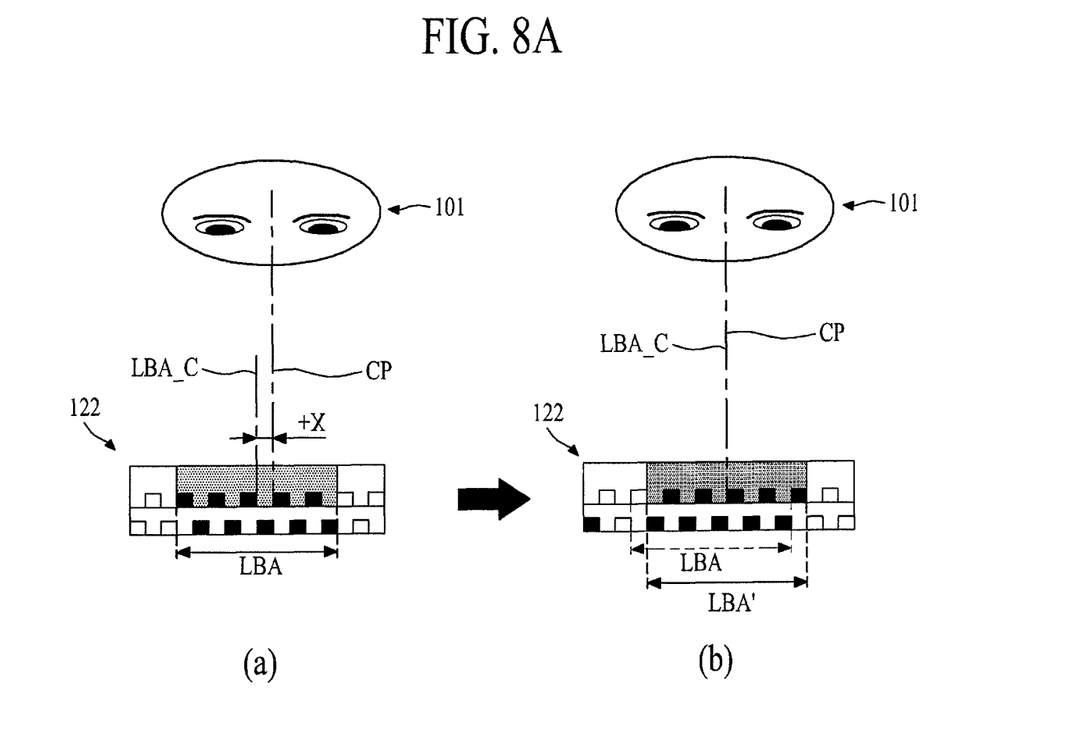

As an example, as illustrated in a portion (a) of FIG. 8A, when the viewing position CP based on the viewing position information on the viewer 101 is disposed at a distance of +X rightward from a central portion LBA_C of the light blocking area LBA, the controller 140 generates the first voltage change information for moving the central portion LBA_C of the light blocking area LBA' to the right by the distance of +X to dispose the central portion LBA_C at the regular position corresponding to the viewing position CP of the viewer 101 according to the viewing position information on the viewer 101 as illustrated in a portion (b) of FIG. 8A.

Figure 8B:
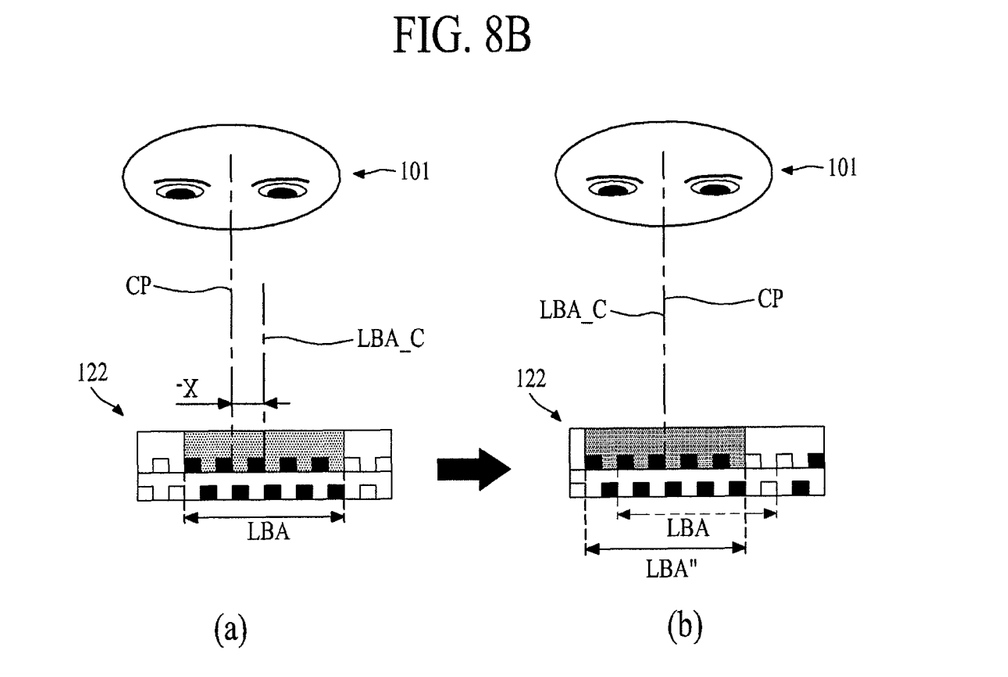

As another example, as illustrated in a portion (a) of FIG. 8B, when the viewing position CP based on the viewing position information on the viewer 101 is disposed at a distance of −X leftward from the central portion LBA_C of the light blocking area LBA, the controller 140 generates the first voltage change information for moving the central portion LBA_C of the light blocking area LBA'' to the left by the distance of −X to dispose the central portion LBA_C at the regular position corresponding to the viewing position CP of the viewer 101 according to the viewing position information on the viewer 101 as illustrated in a portion (b) of FIG. 8B.

The barrier driver 124 of the barrier module 120 applies the first voltage or second voltage to the channels C1 to C16 of each barrier channel BC so as to correspond to the first voltage change information supplied from the controller 140, thereby changing the state of the barrier voltage applied to the channels C1 to C16 of each barrier channel BC. Therefore, the central portion of the light transmitting area LTA or light blocking area LBA, which is formed in each barrier channel BC of the barrier panel 122, is formed to be accurately disposed at the viewing position CP of the viewer 101.

A driving method of the stereoscopic image display device 100 according to the first embodiment of the present invention will be described below in detail.

First, when the stereoscopic image display device 100 is changed from the 2D display mode to the 3D display mode, the position detector 130 detects viewing position information on the viewer 101 that views a stereoscopic image displayed on the display module 110.

Subsequently, the stereoscopic image display device 100 corrects the positions of the light transmitting area and light blocking area that are alternately formed in the barrier module 120, on the basis of the detected viewing position information. That is, the stereoscopic image display device 100 corrects the positions of the light transmitting area LTA and light blocking area LBA such that the central portion of the light transmitting area LTA or light blocking area LBA, which is formed in each barrier channel BC of the barrier panel 122, is accurately disposed at the viewing position CP of the viewer 101 corresponding to the viewing position information.

Subsequently, the stereoscopic image display device 100 separates and displays a left-eye image and a right-eye image, and alternately forms the position-corrected light transmitting area LTA and light blocking area LBA in the barrier module 120 in synchronization with the separated and displayed images, thereby transmitting the left-eye image and right-eye image through the light transmitting area LTA. Therefore, the viewer 101 discerns the left-eye image and right-eye image, which pass through the light transmitting area LTA of the barrier module 120, to view a stereoscopic image.

The stereoscopic image display device 100 and the driving method thereof, according to the first embodiment of the present invention, correct the positions of the light transmitting area LTA and light blocking area LBA to be accurately disposed at the viewing position of the viewer 101 in driving of the 3D display mode, thus providing a comfortable and accurate stereoscopic image to a viewer.

Figure 9:
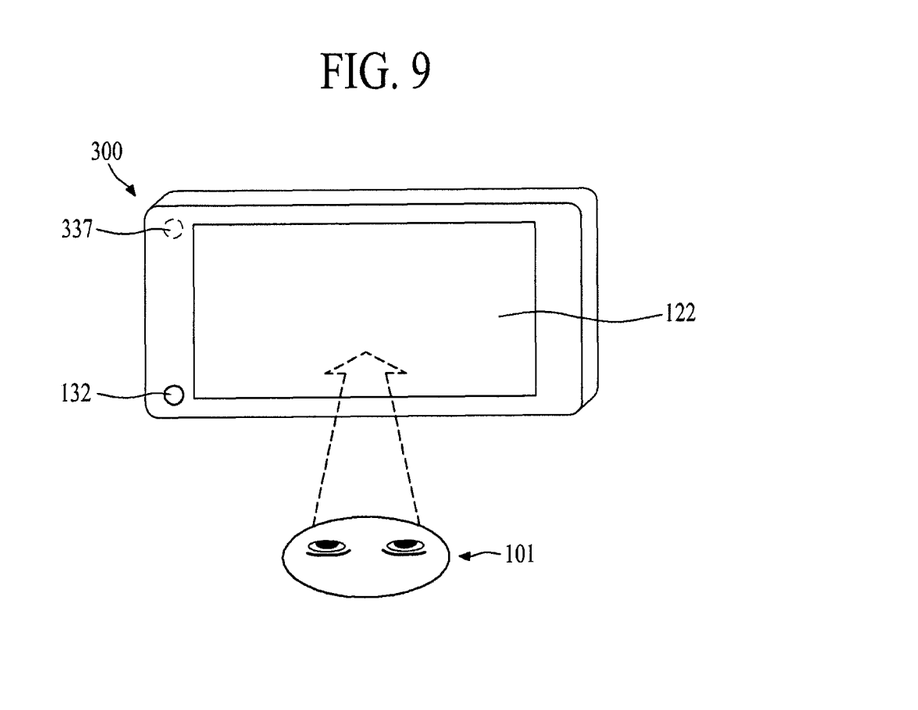
FIG. 9 is a view schematically illustrating a stereoscopic image display device according to a second embodiment of the present invention.
Figure 10:
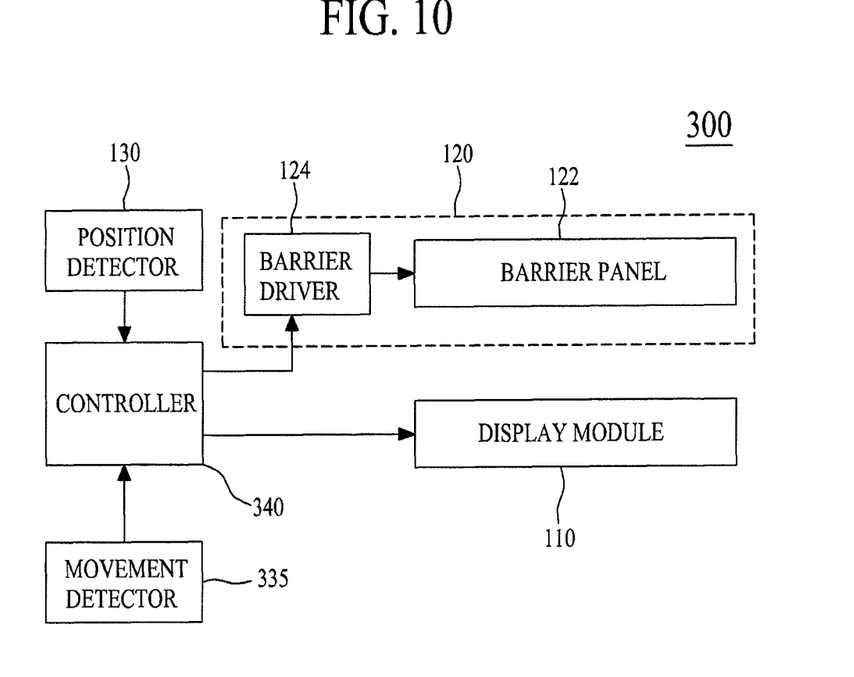
FIG. 10 is a block diagram schematically illustrating a stereoscopic image display device according to a second embodiment of the present invention.

FIG. 9 is a view schematically illustrating a stereoscopic image display device according to a second embodiment of the present invention. FIG. 10 is a block diagram schematically illustrating a stereoscopic image display device according to a second embodiment of the present invention.

Referring to FIGS. 9 and 10, a stereoscopic image display device 300 according to the second embodiment of the present invention includes: a display module 110 that separates and displays a left-eye image and a right-eye image; a barrier module 120 that is disposed in correspondence with the display module 110, and forms a light transmitting area for transmitting a left-eye image and right-eye image and a light blocking area for blocking the left-eye image and right-eye image; a position detector 130 that detects viewing position information on a viewer viewing the left-eye image and right-eye image; a movement detector 335 that detects movement information on the display module 110; and a controller 340 that corrects an initial position of the light transmitting area and an initial position of the light blocking area on the basis of the viewing position information and corrects a position of the light transmitting area and a position of the light blocking area on the basis of the movement information. The stereoscopic image display device 300 according to the second embodiment of the present invention may further include the movement detector 335. Except the controller 340 that corrects the positions of the light transmitting area and light blocking area on the basis of the viewing position information and the movement information, the stereoscopic image display device 300 has the same configuration as that of the stereoscopic image display device 100 according to the first embodiment of the present invention, and thus, a detailed description on the same elements is not provided and the above description is applied thereto. Like reference numerals refer to like elements throughout.

Figure 11:
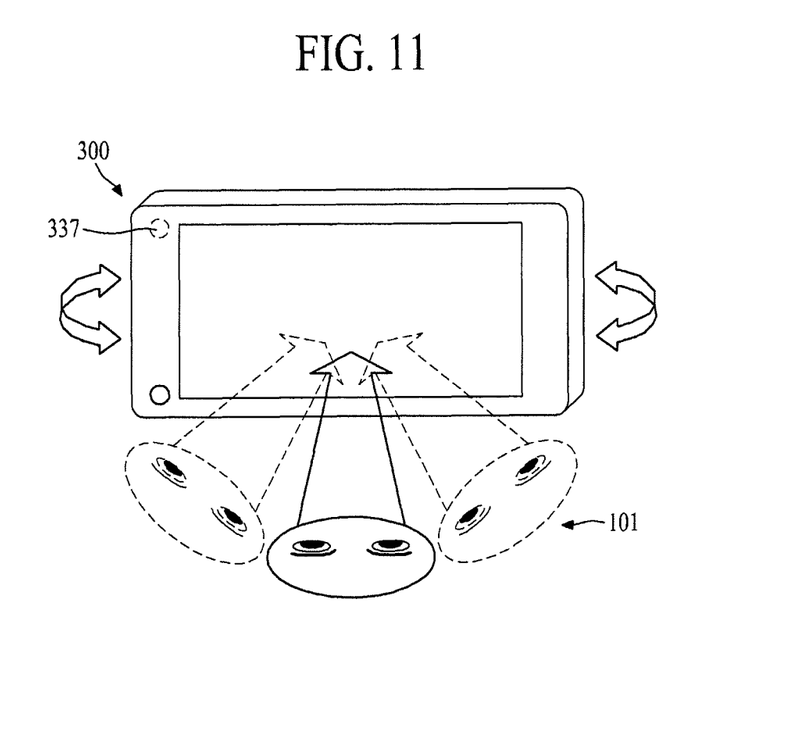
FIGS. 11 and 12 are views for schematically describing the movement of a stereoscopic image display device.

First, as illustrated in FIG. 11, the stereoscopic image display device 300 may move or rotate by a motion of the viewer 101 or the viewer 101, in the 3D display mode. In this case, a viewing position of the viewer 101 is changed, and thus, the viewer 101 cannot view a stereoscopic image or feels dizzy. Accordingly, in the stereoscopic image display device 300, the movement detector 335 corrects respective positions of the light transmitting area and light blocking area according to the movement of the stereoscopic image display device 300.

Figure 12:
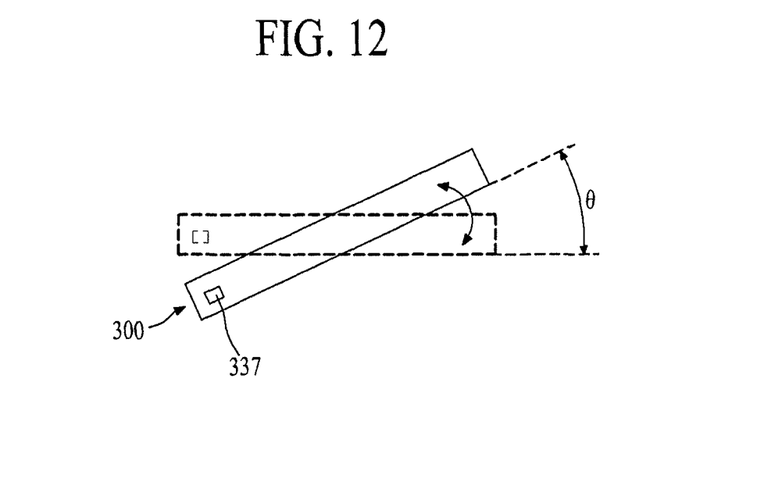
Figure 13:
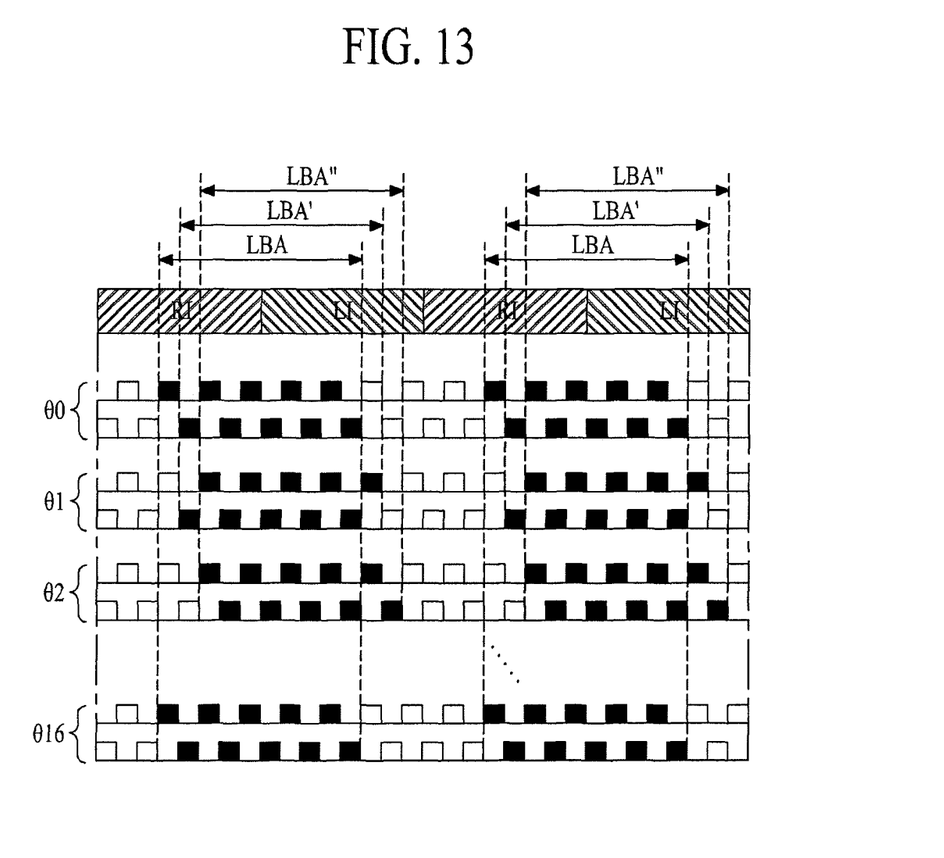
FIG. 13 is a view for schematically describing the shift of a light blocking area according to the movement of a stereoscopic image display device.

The movement detector 335 is disposed inside the stereoscopic image display device 300, and detects movement information corresponding to the movement of the display module 110 or stereoscopic image display device 300 to supply the movement information to the controller 340. In this case, the movement of the stereoscopic image display device 300 may occur when the viewer 101 moves while viewing a 3D image or when playing a 3D game, and the movement information may be information that corresponds to a tilted angle and/or rotated angle of the stereoscopic image display device 300 by the viewer 101. For example, when the viewer 101 tilts the stereoscopic image display device 300 in at least one direction of the X axis, Y axis, and Z axis, as illustrated in FIG. 12, the movement detector 335 detects movement information corresponding to a slope ($\theta$) of the stereoscopic image display device 300. For this end, the movement detector 335 includes a gyro sensor module 337 that measures an angular speed, which is applied in the X axis, Y axis, and Z axis according to the movement of the stereoscopic image display device 300, to detect movement information.

When the stereoscopic image display device 300 is changed from the 2D display mode to the 3D display mode, as illustrated in FIGS. 8A and 8B, the controller 340 corrects or sets the initial positions of the light transmitting area LTA and a light blocking area LBA formed in the barrier module 120, on the basis of the viewing position information supplied from the position detector 130. That is, the controller 340 generates first voltage change information for changing the state of a barrier voltage applied to channels C1 to C16 of each barrier channel BC, on the basis of the viewing position information, provides the first voltage change information to the barrier driver 124, and thus allows the central portion of the light transmitting area LTA or light blocking area LBA to be disposed at a regular position corresponding to the viewing position information on the viewer 101.

Subsequently, during the 3D display mode, the controller 340 corrects the positions of the light transmitting area and light blocking area that are formed in the barrier panel 122, on the basis of the movement information supplied from the movement detector 335.

Specifically, the controller 340 detects a rotated angle ($\theta$) and rotated direction of the stereoscopic image display device 300 on the basis of the movement information, and generates second voltage change information for correcting the positions of the light transmitting area LTA or light blocking area LBA according to the rotated angle ($\theta$) and rotated direction.

At this point, the controller 340 may determine a rotation direction of the rotated angle (θ) with respect to a rotation axis, or compare a plurality of continuously-changed rotated angles (θ) to determine the rotation direction.

In an embodiment of the present invention, the second voltage change information may be information for individually applying the first voltage or second voltage to the channels C1 to C16 of each barrier channel BC.

In another embodiment of the present invention, as illustrated in FIG. 12, the second voltage change information may be second shift information for shifting (LBA', LBA") the second voltage, which is applied to ten channels ("■") forming the light blocking area LBA of each barrier channel BC, per channel according to a plurality of rotated angles (θ0 to θ16) corresponding to the movement information. For this end, the controller 340 may include a lookup table to which the second shift information is mapped in correspondence with the movement information. Herein, the second shift information is set according to the number of channels configuring each barrier channel BC, namely, the number of lower substrate electrodes. As an example, when a rotated angle corresponding to the movement information is one degree, the second shift information is information for shifting the light blocking area LBA by one channel. As another example, when the rotated angle corresponding to the movement information is ten degrees, the second shift information is information for shifting the light blocking area LBA by ten channels.

Figure 14:
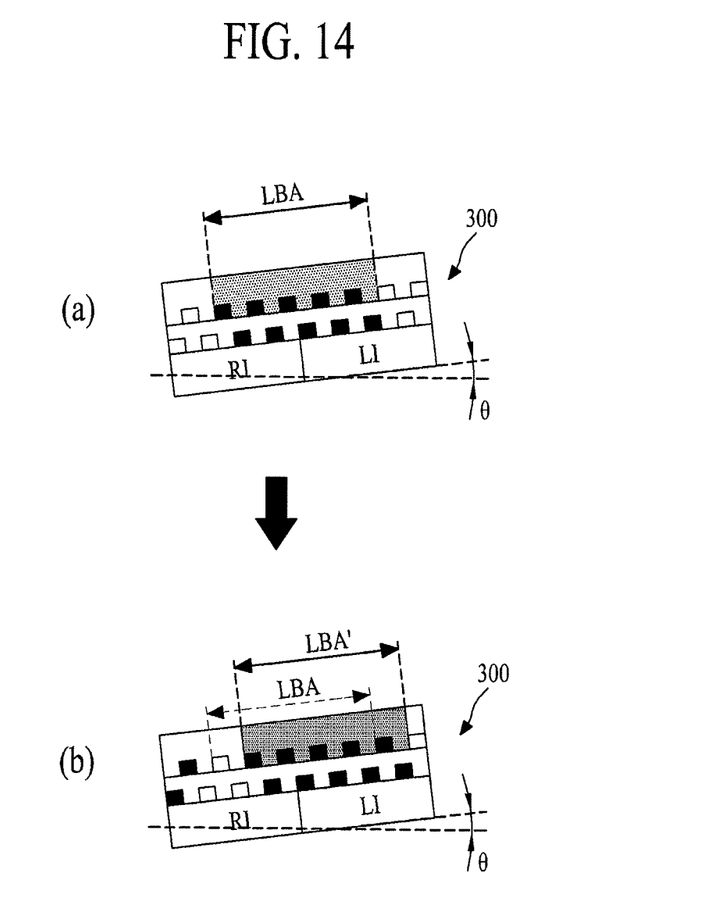
FIG. 14 is a view for describing a method of correcting a position of a light blocking area according to the movement of a stereoscopic image display device.

As a result, as illustrated in a portion (a) of FIG. 14, when the stereoscopic image display device 300 rotates at a certain rotation angle (θ), the controller 340 generates the second voltage change information for moving (LBA') the light blocking area LBA in correspondence with the certain rotation angle (θ) to correct the light blocking area LBA to a regular position.

The barrier driver 124 of the barrier module 120 applies the first voltage or second voltage to the channels C1 to C16 of each barrier channel BC so as to correspond to the first voltage change information supplied from the controller 340, thereby changing the state of the barrier voltage applied to the channels C1 to C16 of each barrier channel BC. Therefore, the central portion of the light transmitting area LTA or light blocking area LBA, which is formed in each barrier channel BC of the barrier panel 122, is formed to be accurately disposed at the viewing position CP of the viewer 101.

The barrier driver 124 applies the first voltage or second voltage to the channels C1 to C16 of each barrier channel BC so as to correspond to the second voltage change information supplied from the controller 340, thereby changing the state of the barrier voltage applied to the channels C1 to C16 of each barrier channel BC. Therefore, the position of the light blocking area LBA formed in each barrier channel BC of the barrier panel 122 is always corrected to the regular position according to the movement of the stereoscopic image display device 300.

Figure 15:
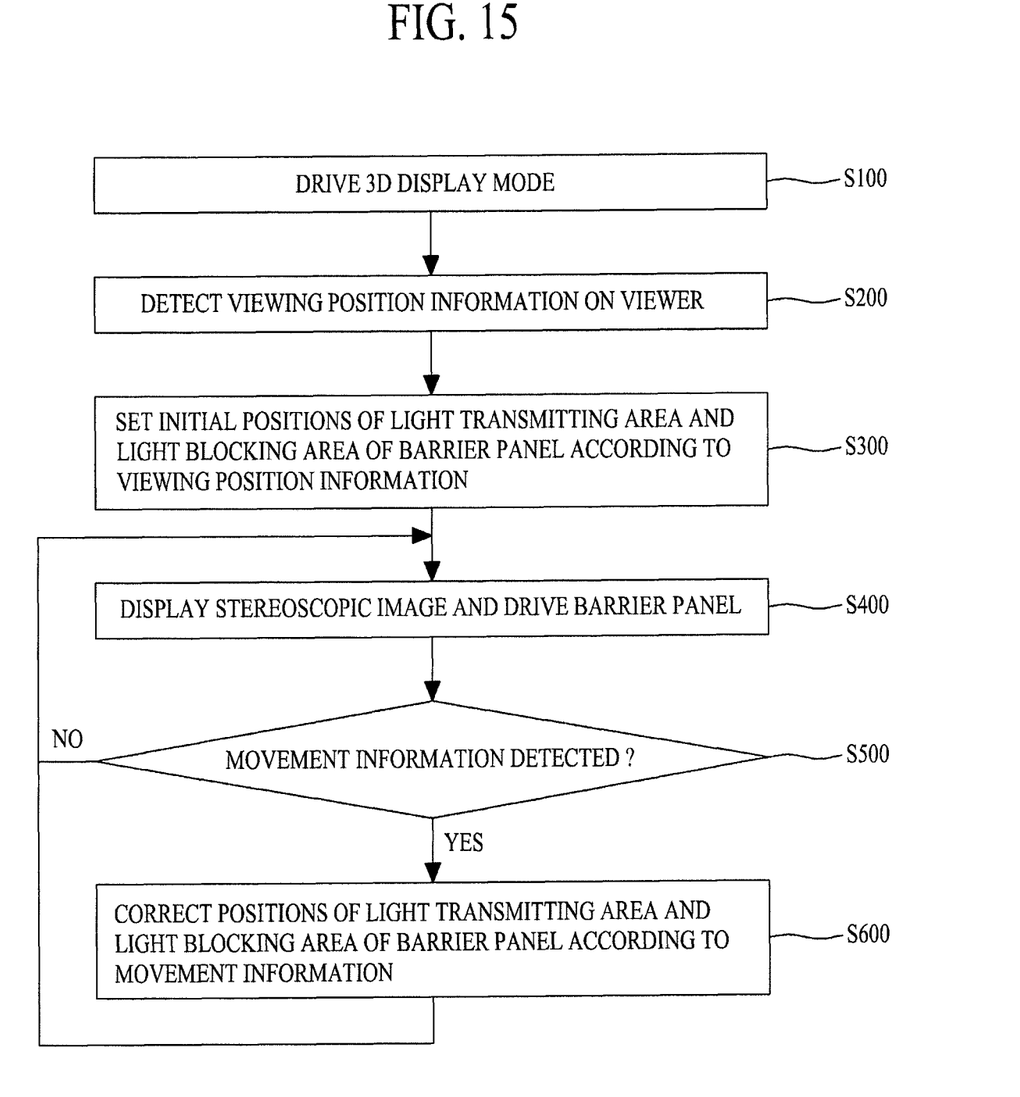
FIG. 15 is a flowchart illustrating a driving method of a stereoscopic image display device according to a second embodiment of the present invention.

FIG. 15 is a flowchart illustrating a driving method of a stereoscopic image display device according to a second embodiment of the present invention.

The driving method of the stereoscopic image display device according to the second embodiment of the present invention will be described below with reference to FIGS. 9 to 15.

In operation S100, the stereoscopic image display device 300 is first driven in the 3D display mode according to the viewer's selection or the kind of input data, in the 2D display mode.

In operation S200, when the stereoscopic image display device 300 is changed from the 2D display mode to the 3D display mode, the position detector 130 detects viewing position information on the viewer 101 that views a stereoscopic image displayed on the display module 110.

In operation S300, subsequently, the stereoscopic image display device 300 corrects the positions of the light transmitting area LTA and light blocking area LBA that are alternately formed in the barrier module 120, on the basis of the detected viewing position information. That is, as illustrated in FIGS. 8A and 8B, the stereoscopic image display device 300 corrects the positions of the light transmitting area LTA and light blocking area LBA such that the central portion of the light transmitting area LTA or light blocking area LBA, which is formed in each barrier channel BC of the barrier panel 122, is accurately disposed at the viewing position CP of the viewer 101 corresponding to the viewing position information.

Subsequently, the stereoscopic image display device 300 separates the left-eye image and right-eye image to display a stereoscopic image on the display module, and alternately forms the position-corrected light transmitting area LTA and light blocking area LBA in the barrier module 120 in synchronization with the separated and displayed images, thereby transmitting the left-eye image and right-eye image through the light transmitting area LTA to provide a stereoscopic image to the viewer 101. Therefore, the viewer 101 discerns the left-eye image and right-eye image, which pass through the light transmitting area LTA of the barrier module 120, to view the stereoscopic image in operation S400.

In operation S500, subsequently, the movement detector 335 detects the movement of the stereoscopic image display device 300 while the stereoscopic image is being displayed on the stereoscopic image display device 300.

When the movement of the stereoscopic image display device 300 has been detected by the movement detector 335 ("Yes" of the operation S500), the movement detector 335 corrects the position of the light blocking area LBA formed in the barrier panel 122 according to the movement information in operation S600.

When the position of the light blocking area LBA has been corrected according to the movement information, the operations S400 to S600 are repeated.

When the movement of the stereoscopic image display device 300 is not detected by the movement detector 335 ("No" of the operation S500), the operations S400 and S500 are repeated.

The stereoscopic image display device 300 and the driving method thereof, according to the second embodiment of the present invention, correct the positions of the light transmitting area LTA and light blocking area LBA to be accurately disposed at the viewing position of the viewer 101 in driving of the 3D display mode, and correct the positions of the light transmitting area LTA and light blocking area LBA according to the movement of the stereoscopic image display device 300, thus providing a comfortable and accurate stereoscopic image to a viewer.

According to the embodiments of the present invention, by correcting the positions of the light transmitting area and light blocking area in order for the viewing position of a viewer to be accurately adjusted when changing the 2D display mode to the 3D display mode, a comfortable and accurate stereoscopic image can be provided to the viewer.

Moreover, the present invention corrects the positions of the light transmitting area and light blocking area according to the movement of the stereoscopic image display device during the 3D display mode, and thus can provide a comfortable and accurate stereoscopic image to the viewer.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereoscopic image display device comprising:
 a display module separating a left-eye image and a right-eye image to display a stereoscopic image;
 a barrier module disposed in correspondence with the display module, and forming a light transmitting area for transmitting the left-eye image and right-eye image and a light blocking area for blocking the left-eye image and right-eye image, each of the light transmitting area and the light blocking area including a central portion;
 a position detector detecting position information on a viewer which views the stereoscopic image displayed on the display module;
 a movement detector detecting movement information on the stereoscopic image display device;
 a controller detecting a rotated angle and a rotated direction of the stereoscopic image display device based on the movement information and correcting positions of the light transmitting area and light blocking area based on viewing position information on the viewer, the movement information detected by the movement detector and the rotated angle and the rotated direction of the stereoscopic image display device, the viewing position information corresponding to a central portion between the left-eye image and the right-eye image of the viewer,
 wherein the barrier module comprises:
 a barrier panel comprising a liquid crystal layer, and a liquid crystal driving electrode part which changes an aligned state of liquid crystal molecules in the liquid crystal layer, and
 a barrier driver generating a barrier voltage for forming the light transmitting area and light blocking area in the barrier panel according to a control of the controller based on the viewing position information and the movement information, and applying the barrier voltage to the liquid crystal driving electrode part,
 wherein the liquid crystal driving electrode part comprises a plurality of individually addressable lower substrate electrodes formed in a multi-layer structure where the lower substrate electrodes are crossed in a zigzag shape on a first substrate disposed on the display module; and
 an upper substrate electrode formed on a second substrate which is coupled to the first substrate with the liquid crystal layer therebetween,
 wherein a barrier channel of the barrier panel includes the light blocking area and the light transmitting area, the light blocking area being formed by a change in an alignment of the liquid crystal molecules according to the barrier voltage from the barrier driver that is individually addressed to the lower substrate electrodes so that a certain number of the lower substrate electrodes are collectively formed as the light blocking area, the light transmitting area being formed by a remaining area of the barrier channel where there is no alignment change of the liquid crystal molecules, and the barrier channel being variably overlapped over both a left-eye pixel and a right-eyed pixel, and
 wherein the central portion between the left-eye image and the right-eye image of the viewer is corrected so that the central portion between the left-eye image and the right-eye image of the viewer is matched with the central portion of one of the light transmitting area and the light blocking area by the corrected positions of the light transmitting area and light blocking area.

2. The stereoscopic image display device according to claim 1, wherein the position detector detects one of eyes, eyeball, and eyebrows of the viewer to detect the viewing position information.

3. The stereoscopic image display device according to claim 1, wherein the plurality of lower substrate electrodes are formed in a double-layer structure with an insulation layer therebetween, the lower substrate electrodes formed on the insulation layer are respectively formed between the lower substrate electrodes formed on the first substrate; and
 wherein the upper substrate electrode receives a common voltage from the barrier driver.

4. The stereoscopic image display device according to claim 3, wherein,
 the controller generates first voltage change information for changing a state of the barrier voltage applied to the lower substrate electrodes on the basis of the viewing position information such that the light transmitting area and light blocking area are accurately disposed at the viewing position of the viewer, and
 the barrier driver changes a state of the barrier voltage applied to the lower substrate electrodes, according to the first voltage change information.

5. The stereoscopic image display device according to claim 3, wherein the controller generates second voltage change information for changing a state of the barrier voltage applied to the substrate electrodes for the positions of the light transmitting area and light blocking area to be corrected according to the movement information, and
 the barrier driver changes the state of the barrier voltage applied to the substrate electrodes to correspond to the second voltage change information.

6. The stereoscopic image display device according to claim 5, wherein,
 the controller generates the second voltage change information for correcting the positions of the light transmitting area and light blocking area according to the rotated angle and rotated direction.

7. A driving method of a stereoscopic image display device which includes: a display module separating a left-eye image and a right-eye image to display a stereoscopic image; and a barrier module disposed in correspondence with the display module, and forming a light transmitting area for transmitting the left-eye image and right-eye image and a light blocking area for blocking the left-eye image and right-eye image, each of the light transmitting area and the light blocking area including a central portion, the driving method comprising:
 detecting position information on a viewer which views the stereoscopic image displayed on the display module;
 detecting movement information on the stereoscopic image display device;
 detecting a rotated angle and a rotated direction of the stereoscopic image display device based on the movement information;
 correcting positions of the light transmitting area and light blocking area by individually controlling a plurality of lower substrate electrodes formed in a multi-layer structure where the lower substrate electrodes are crossed in a zigzag shape, based on viewing position information on the viewer, the movement information and the rotated angle and the rotated direction of the stereoscopic image display device, the viewing position information corresponding to a central portion between the left-eye image and the right-eye image of the viewer;

separating the left-eye image and right-eye image to display a stereoscopic image on the display module; and providing the stereoscopic image to the viewer through the corrected light transmitting area and light blocking area, wherein the correcting of positions comprises generating a barrier voltage for forming the light transmitting area and light blocking area according to the viewing position information, the movement information and the rotated angle and the rotated direction of the stereoscopic image display device, wherein a barrier channel of the barrier panel includes the light blocking area and the light transmitting area, the light blocking area being formed by a change in an alignment of the liquid crystal molecules according to the barrier voltage that is individually addressed to the lower substrate electrodes so that a certain number of the lower substrate electrodes are collectively formed as the light blocking area, the light transmitting area being formed by a remaining area of the barrier channel where there is no alignment change of the liquid crystal molecules, and the barrier channel being variably overlapped over both a left-eye pixel and a right-eye, and wherein the central portion between the left-eye image and the right-eye image of the viewer is corrected so that the central portion between the left-eye image and the right-eye image of the viewer is matched with the central portion of one of the light transmitting area and the light blocking area by the corrected positions of the light transmitting area and light blocking area.

8. The driving method according to claim 7, wherein the position information on the viewer comprises a position of one of eyes, eyeball, and eyebrows of the viewer.

9. The driving method according to claim 7, wherein the correcting of positions comprises:

generating first voltage change information for changing a state of the barrier voltage applied to the lower substrate electrodes on the basis of the viewing position information such that the light transmitting area and light blocking area are accurately disposed at a viewing position of the viewer, and changes a state of the barrier voltage applied to the lower substrate electrodes, according to the first voltage change information.

10. The driving method according to claim 7, wherein the correcting of the positions comprises:

generating second voltage change information for correcting the positions of the light transmitting area and light blocking area according to the rotated angle and rotated direction; and changing the state of the barrier voltage applied to the lower substrate electrodes to correspond to the second voltage change information.

* * * * *